United States Patent [19]

Lemery et al.

[11] 3,993,263
[45] Nov. 23, 1976

[54] FISHING REEL

[75] Inventors: Jean Paul Lemery, Cluses; Gaston Pithois, Marnaz, both of France

[73] Assignee: Garcia Corporation, Teaneck, N.J.

[22] Filed: Apr. 11, 1975

[21] Appl. No.: 567,106

Related U.S. Application Data

[63] Continuation of Ser. No. 401,454, Sept. 27, 1973, abandoned.

[30] Foreign Application Priority Data

Oct. 2, 1972  France ............................ 72.034840

[52] U.S. Cl. ........................................ 242/84.21 R
[51] Int. Cl.² ........................................ A01K 89/00
[58] Field of Search ............. 242/84.21 A, 84.21 R, 242/84.2 A, 84.2 R, 84.2 E, 84.5 A, 84.51 A

[56] References Cited
UNITED STATES PATENTS

| | | | |
|---|---|---|---|
| 2,600,558 | 6/1952 | Mayborgne | 242/84.21 R |
| 2,627,383 | 2/1953 | Tibbetts | 242/84.2 E |
| 2,771,253 | 11/1956 | Mayborgne | 242/84.2 E |
| 2,854,200 | 9/1958 | Montgomery | 242/84.21 A |
| 3,351,301 | 11/1967 | Bretton | 242/84.21 R |
| 3,858,822 | 1/1975 | Wood | 242/84.2 A |

FOREIGN PATENTS OR APPLICATIONS 1,110,429   10/1955   France ............................ 242/84.2 E

*Primary Examiner*—Edward J. McCarthy
*Attorney, Agent, or Firm*—Fitzpatrick, Cella, Harper & Scinto

[57] ABSTRACT

A fixed spool fishing reel has a manually accessible winding cup carrying a line pick-up mounted at the forward end of a rotatable shaft disposed coaxially in the spool. The shaft and cup are movable axially from a rear reeling-in position in which the pick-up is above the spool to a forward casting position in which the cup and pick-up completely free the spool, a spring urging the shaft forwardly. The winding cup is manually accessible so that it can be rearwardly displaced by the fisherman's finger from the reeling-in position, to free it from a locking device whereupon the spring moves shaft and cup into the casting position, in which the finger is conveniently placed to catch and control the line.

29 Claims, 31 Drawing Figures

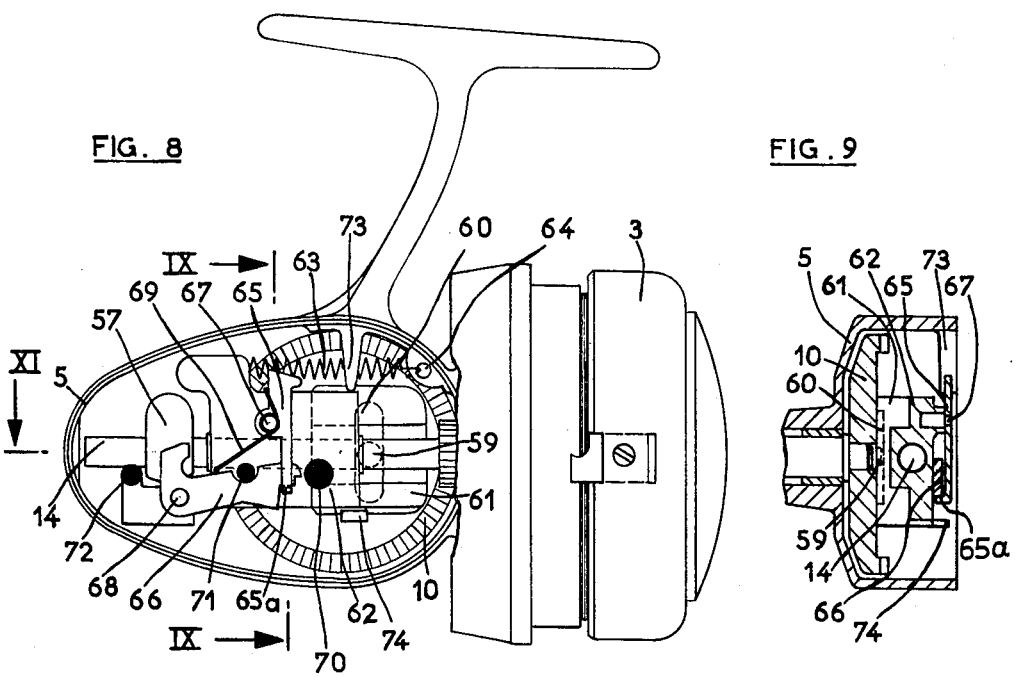
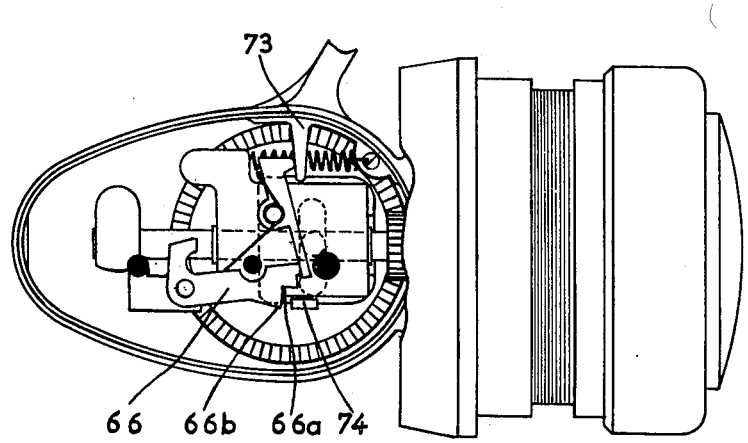

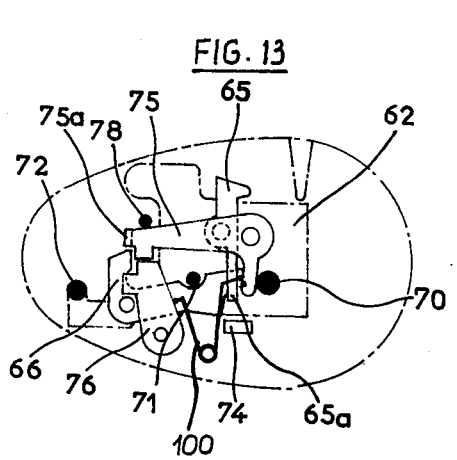
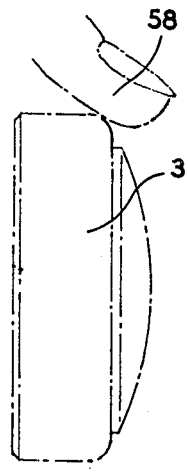
FIG. 13
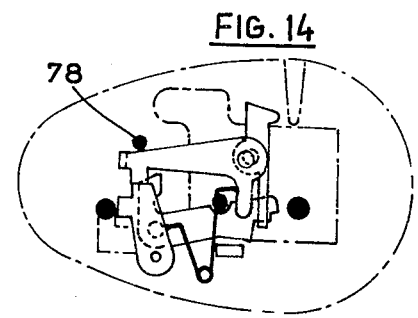
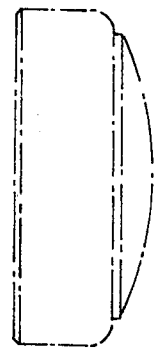
FIG. 14
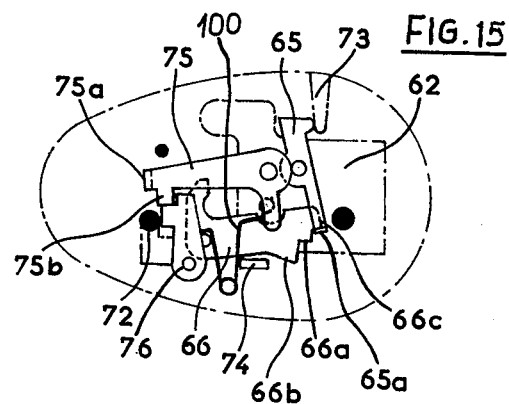
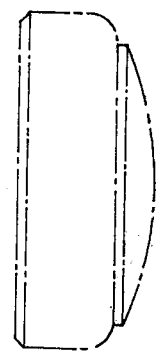
FIG. 15

FISHING REEL

This is a continuation, of application Ser. No. 401,454, filed Sept. 27, 1973, now abandoned.

The present invention relates to longitudinal-axis fixed-spool fishing-reels for casting.

In known so-called spin-casting reels of this type the line recovery system or winding cup caps the spool, to prevent tangling of the line, but there are various disadvantages, notably that the line leaving the spool passes through a relatively narrow annular passage defined between a nose cone and the winding cup and is braked as it leaves, since as it leaves the spool during casting the line has a tendency to occupy a space the diameter of which is larger than the outer diameter of the annular space. The line consequently strikes against the wall of the nose cone instead of being able to escape freely, and this reduces the length of the cast.

Moreover, in the event of accidental tangling of the line on the spool due to kinking of the line as a result of twisting, it is necessary in order to disentangle the line to have access to the spool and therefore to remove certain members arranged in front of the reel.

In order to correct these disadvantages it has already been proposed to uncover the spool during casting. In known constructions this operation always needs the use of both hands, the user moving the assembly of the spool and its support backwards with one hand, whilst preparing to simultaneously hold the thread during its release with the other hand. In other constructions, it is necessary to backwardly rotate the crank with the left hand in order to retract the line pick-up finger, the line being held by the right hand.

Finally, in other constructions the bell or winding cup driving the pick-up finger is pushed forwards by a trigger or a lever and clamps the line by pinching it against the nose cone; the line is therefore not controlled by the finger during casting, which reduces the accuracy of casting.

The present invention aims to avoid these disadvantages of known longitudinal-axis fixed-spool reels.

According to the invention, a longitudinal-axis fishing reel comprises a fixed spool in front of which is arranged a reeler member including a line pick-up and integral with a shaft movable in rotation and in translation, driven in rotation by a crank and a gearing, in which the line can be freed from the pick-up by pressure of a finger of the hand holding the rod on the front portion of the reel, and means for controlling the locking and unlocking of the reeler member, characterized by the fact that said locking means consist of a locking mechanism arranged behind the spool, the means for controlling unlocking of the reeler member consisting of the reeler member and the shaft which is integral with it, this shaft being subject to the action of resilient means which urge it forwards, the locking mechanism being unlockable by axial displacement of the shaft by finger pressure on the reeler member, the spool being at least partially uncovered in the locking position of the said mechanism.

With a reel according to the invention it is possible with only one finger of the hand holding the rod, to control disengagement or uncovering of the spool during casting and to control the line with accuracy. This disengagement can be total and can be effected whatever be the position of the spool relative to the reeler member supporting the line pick-up finger. Also, during reeling-in of the line the spool is constantly visible and accessible, and the fisherman is able to continuously watch the lay of the line and hence detect possible incorrect spooling due in particular to kinking of the line. He can if necessary have access to the spool without dismantling any member.

These result can be obtained with a reel according to the invention in which the volume of the reeler member arranged in front of the spool is kept relatively small, which also enables a longer cast.

It is possible to provide a reel according to the invention including means for axially reciprocating the shaft during reeling in of the line, these means being arranged at the rear of the spool, and a mechanism for locking the shaft onto said means for axially reciprocating the shaft, locking of this mechanism being actuable by rotation of the crank in a direction for reeling in the line, and unlocking of said mechanism being actuable by pressure of a finger on the reeler member towards the spool against the action of spring means. The spool is preferably completely disengaged or uncovered by the reeler member when the shaft is unlocked, before the casting operation.

In a prefered embodiment of the invention the line recovery device is such that despite the spool being fully uncovered during casting it enables, during recovery of the line, laying of the line in successive layers with complete safety and the line pick-up is constructed and arranged to accurately lay the line in contiguous turns. This facilitates and increases the length of casting. The pick-up is preferably not disposed radially, as is the case in certain known models in which the pick-up is a finger protruding radially from the cup, but is conveniently a plate arranged adjacent to the rear edge of the cup rather than, as known, a pin placed further forward on the outside of cup. In order to enable pickup up of the line without tension, in previously known constructions it had been necessary to enclose the spool and pick-up in a cap which brought about supplementary friction on the line during casting.

Several embodiments of the invention will now be described by way of example with reference to the accompanying drawings, in which:

FIG. 8 is a side elevational view, partially cut-away and in axial cross-section, of a second embodiment in the closed or recovery position;

FIG. 9 is a cross-section taken along line IX—IX of FIG. 8;

FIG. 10 shows the reel of FIG. 8 in the open or casting position;

FIGS. 12, 13, 14 and 15 are schematic diagrams illustrating operation of the second embodiments;

Figure 20:
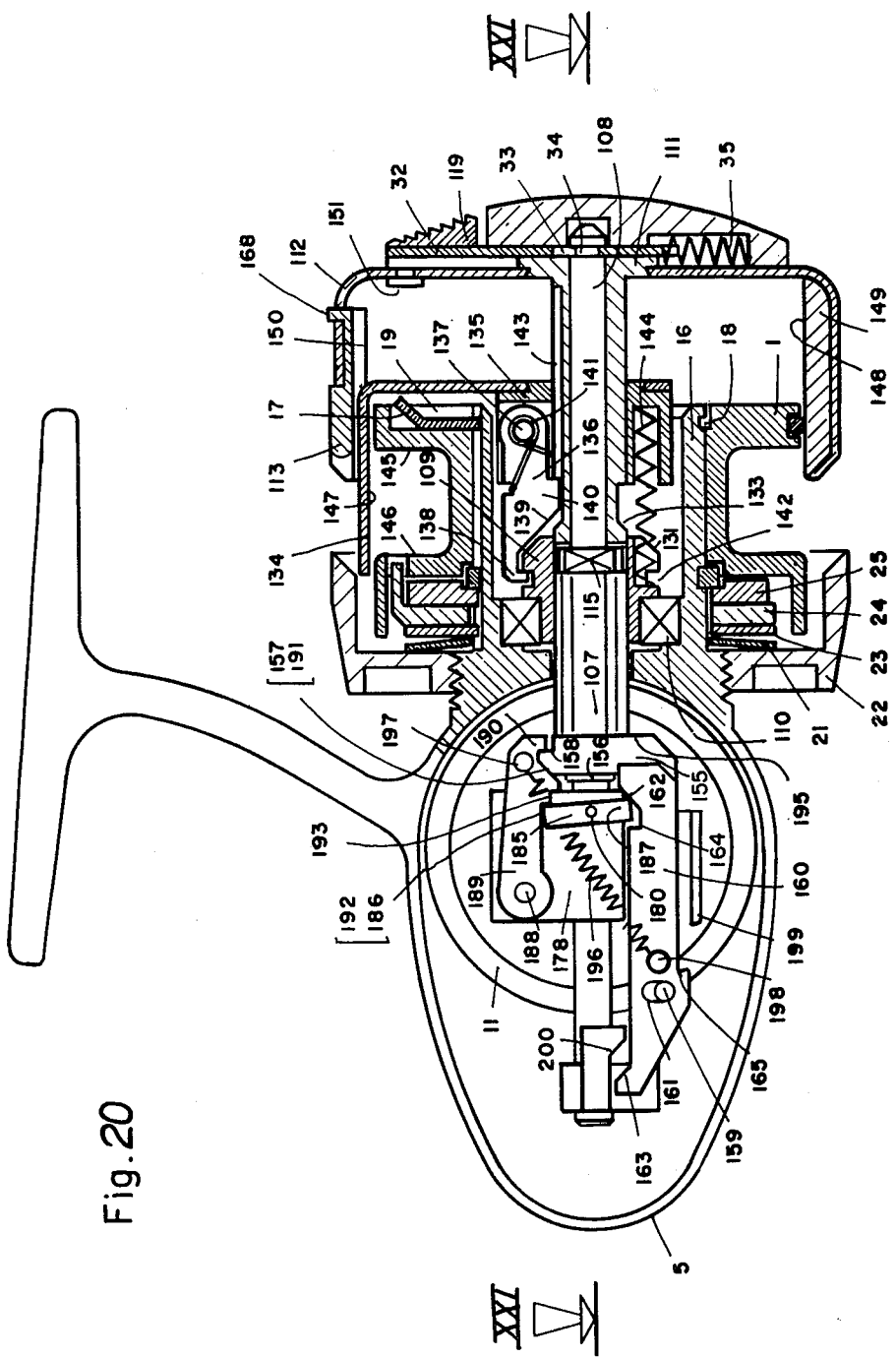
FIG. 20 is a cross-section taken along line XX—XX of FIG. 21 of a fifth embodiment, in which means for stowing the line are provided.
Figure 25:
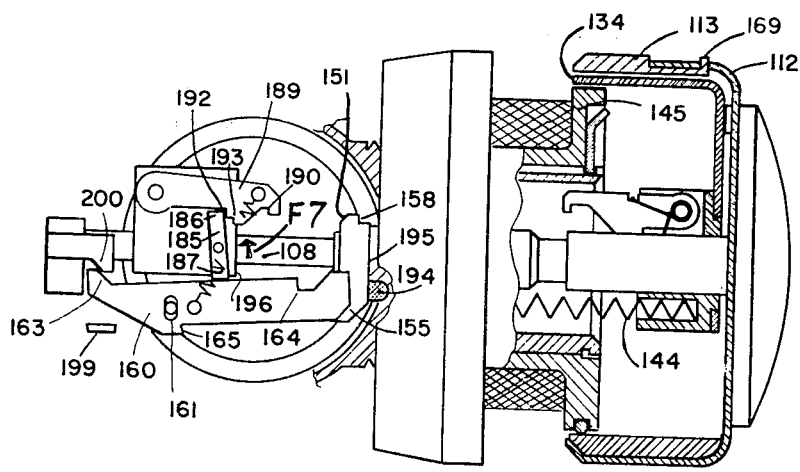
Figure 26:
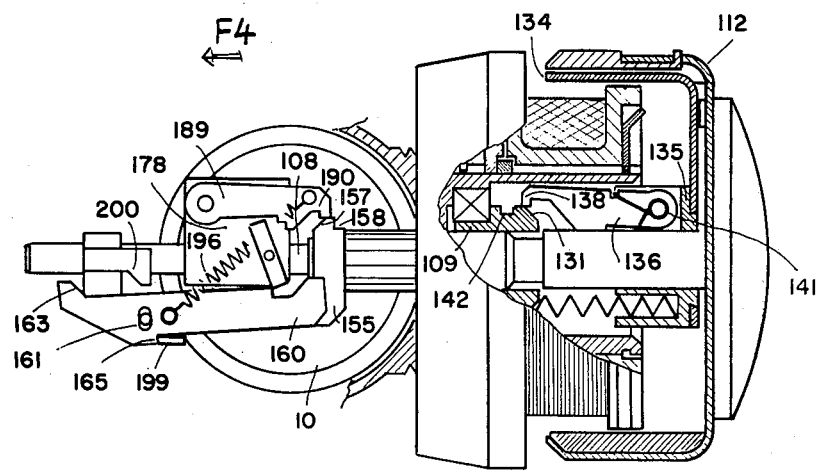
Figure 27:
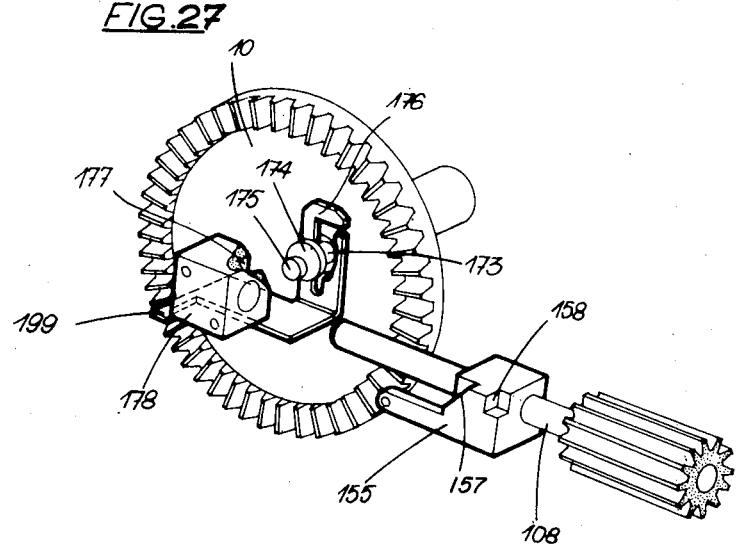
Figure 28:
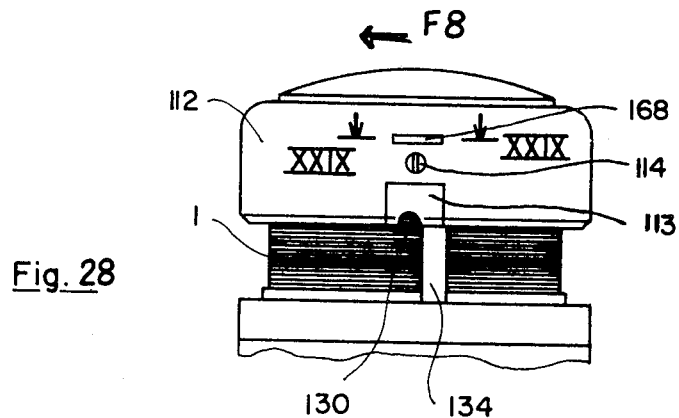
Figure 29:
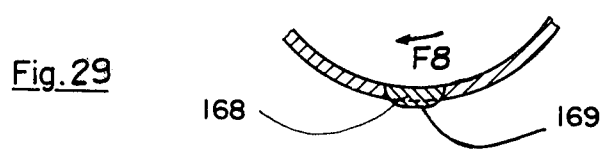

FIGS. 25 and 26 schematically show the reel of FIG. 20 respectively in a casting position and in a position at the beginning of reeling in the line:

FIG. 27 is a perspective view of part of the mechanism housed in the frame of the reel of FIG. 20;

FIGS. 28 and 29 show a catcher plate; and

Figure 30:
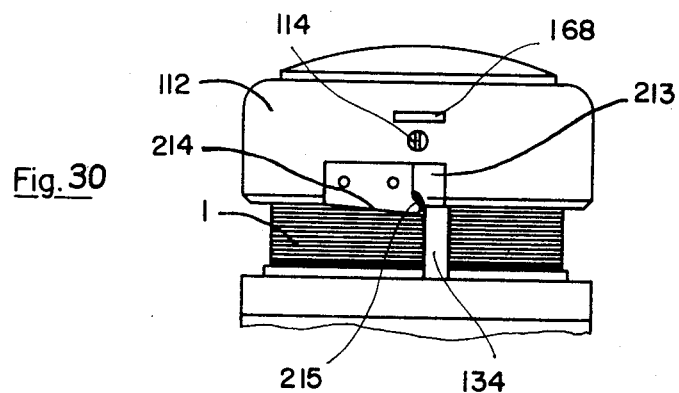
Figure 31:
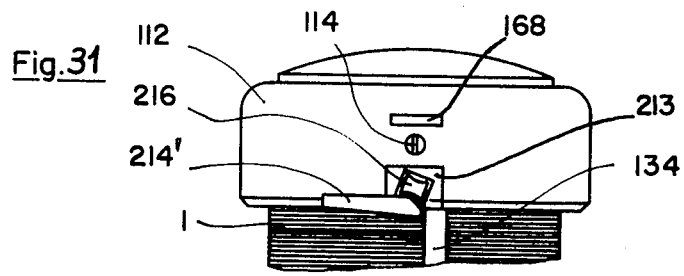

FIGS. 30 and 31 show alternative forms of the catcher plate.

In the following description the word "front" qualifying a portion of any member indicates that this portion is disposed towards the front of the reel; the word "rear" indicates the opposite.

Figures 1, 2, 5:
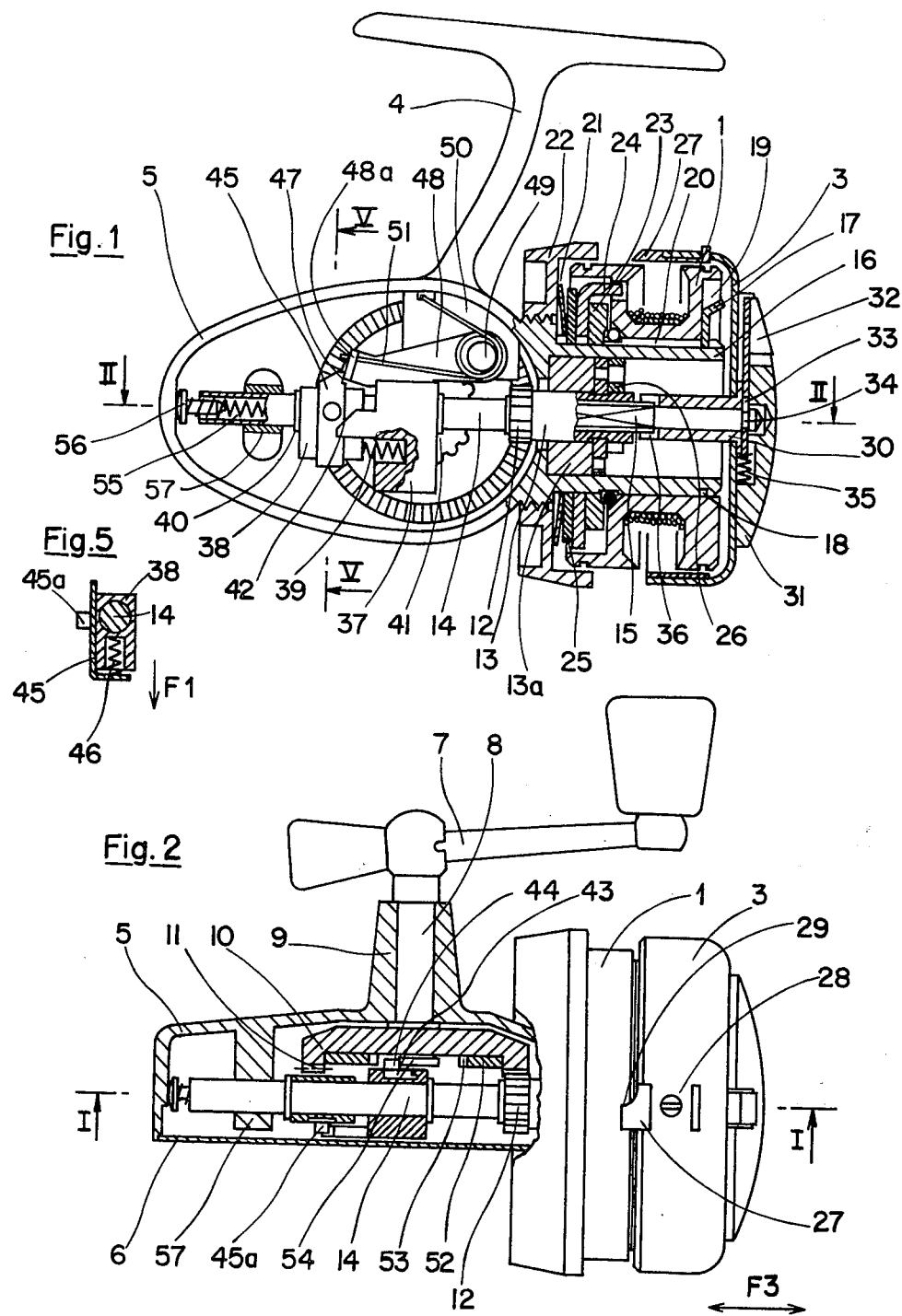
FIG. 1 is an axial cross-section, taken along line I—I of FIG. 2, of a first embodiment in the closed or recovery position.
FIG. 2 is a plan view partially in cross-section taken along line II—II of FIG. 1.
FIG. 5 is a partial transverse cross-section taken along line V—V of FIG. 1.

With reference to FIGS. 1 to 7 the first embodiment of reel comprises a front portion including a fixed spool 1, a spool support 16, a rotary bell or winding cup 3, as well as the attachment members and accessories of these parts, which will be described below as common to all the embodiments and which have consequently been shown once only, in section in FIG. 1.

All the embodiments likewise comprise a foot 4 for attachment of the reel to the underside of a fishing rod, not shown.

Apart from certain details, all the embodiments likewise comprise a casing 5 closed by a cover 6, a crank 7 integral with a shaft 8 rotating in a bearing 9 and having fixed to its inner end a gear 10 with contrate teeth 11 which engage with a pinion 12 integral with a hollow shaft 13, which, in turn, by means of a squared portion 15 is engaged for rotation with a shaft 14 extending from one end of the reel to the other, whilst permitting sliding of shaft 14 in shaft 13.

The front portion common to all the embodiments also includes the cylindrical support 16 which is made in one piece with frame 5, onto which the spool 1 is fixed axially by means of a clip 17 attached to the spool and engaging in a groove 18 in the support 16 and in an axial hollow 19 in the spool. Spool 1 is braked by a ring 24 interposed between two friction rings 23 and 25, adjustment being effected by a drum 22 screwed onto the frame 5 and acting against a spring ring 21.

Inside support 16, the hollow shaft 13 rotates in a bearing 13a on which is mounted an anti-reverse device 26 preventing driving of cup 3 in the direction opposite to that for reeling in.

A line pick-up 27 consisting of a small plate is attached by a screw 28 to the cup 3 and has at its operative end an arcuate cutaway 29.

The winding cup 3 is fixed on a sleeve 30 and has a dome-shaped endpiece 31, this assembly being locked to shaft 14 by a part 32 sliding transversely and having a longitudinal opening 33 the edge of which engages in a groove 34 in the end of the shaft 14 under the pressure of a spring 35.

It is therefore possible to remove cup 3 by pushing part 32 radially to disengage it from neck 34; spool 1 can then be removed by opening clip 17.

Coupling between cup 3 and shaft 4 is effected by the tip of the squared portion 15 and a cutaway tip 36 of sleeve 30.

The locking mechanism of the first embodiment and its control mechanism will now be described.

These mechanisms are composed of parts integral with the shaft 14 and parts integral with the frame 5 and gear 10. The shaft 14 bears a movable fitting comprising a cam-support 37 slidably mounted on shaft 14 and a latch-support 38, these two parts being held apart from one another by a spring 39 and come to bear against two collars 40 and 41 integral with the shaft 14. The support 37 is furnished with a finger ending in an inclined plane which provides a first cam 42. It also bears a transverse (i.e, vertical to the plane of FIG. 2) slide black 43 furnished with a sliding stud 44. The latch-support 38 bears a latch 45 able to slide transversely with respect to the shaft 14 on its support between an upper latching position and a lower non-latching position, and a spring 46 acting on this latch in the direction of arrow F1 (FIG. 5). to bias it toward the non-latching positions Latch 45 has a projection 47 including a plane oblique with respect to the shaft 14 which on forward movement of the latch from its rearward position comes to catch on a cranked tip 48a of a swinging stop 48 mounted pivotally about a pin 49 on a plate 50 fixed on casing 5 and upon which acts a hairpin spring 51 which biases stop 48 towards its first position shown in FIG. 1 for engagement with the latch.

In a cylindrical recess in gear 10 is fixed a concentric ring or crown 52 furnished with radially inwardly-facing teeth 53 whilst a cam 54 is attached to plate 50, the teeth 53 and a second, fixed cam 54 cooperating with stud 44 on slide 43 as will be described later.

The rear end of the shaft 14 is hollow and in it is housed a helicoidal compression spring 55 in the end of which is fitted the shank of a button 56 which comes to bear against frame 5. Shaft 14 is slidably mounted in a bearing 57 made in one piece with casing 5.

The reel locking mechanism functions in the following manner:

When reel 1 is in the recovery position as illustrated in FIG. 2, latch 45 is caught on swingable stop 48 so that cup 3 is held to the rear, letting only a narrow portion of spool 1 on which the line is wound appear, as may be seen in FIG. 2. In this position, rotation of crank 7 rotates cup 3 and pick-up 27 for the recovery of the line and winding it onto spool 1, the pick-up 27 extending above the exposed portion of the line and preventing the line from escaping.

Figure 3:
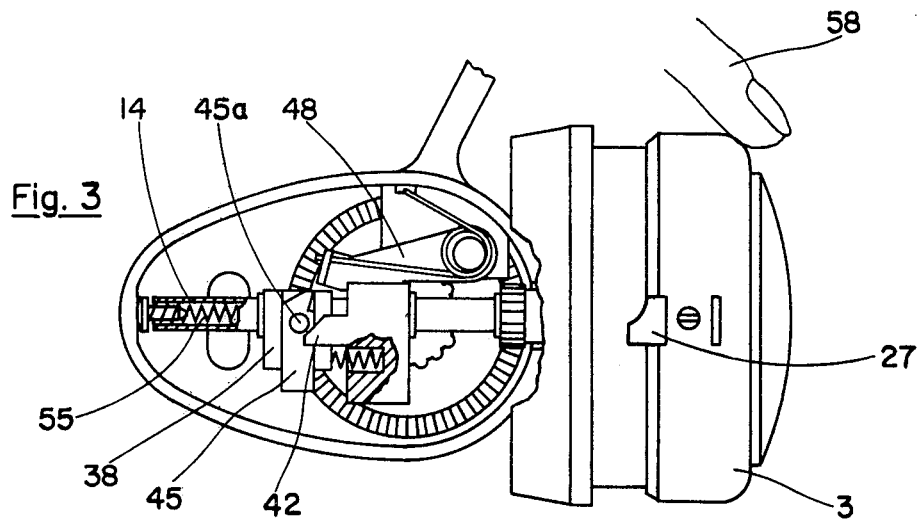
FIGS. 3 and 4 show the reel of FIG. 1 during unlocking and in the open position, respectively.

When the fisherman wishes to cast, by means of his forefinger 58 (FIG. 3) he exerts on cup 3 a pressure the axial component of which pushes cup 3 backwards into the position illustrated in FIG. 3, compressing the spring 55, cup 3 fully covering the line. The latch support 38 is driven axially rearwardly and latch 45 becomes disengaged from the stop 48 and retracts downwardly under the effect its return spring 46. When the fisherman releases the pressure on cup 3, shaft 14 and cup 3 are moved forward into the position of FIG. 4, by spring 55 the stop 48 then being clear of the trajectory of latch 45. The spool 1 is therefore completely uncovered for the cast and there no risk of the line catching on pick-up 27 which is spaced well apart from the front cheek of spool 1.

In the positions illustrated in FIG. 1, 2 and 3 the line passes over pick-up 27. At the moment of pressure by the forefinger 58 on cup 3 this picking up action is emphasized, so preventing any untimely escape of the line. On the other hand, when the pressure is released with the finger 58 still lightly held against cup 3, and cup 3 moves forward into the position of FIG. 4, the line is immediately freed from pick-up 27 and automatically comes to be pinched between the forefinger 58 and cup 3, the fisherman thus immediately having control of his line, with his forefinger 58 in an ideal position for this purpose.

Figures 6, 7:
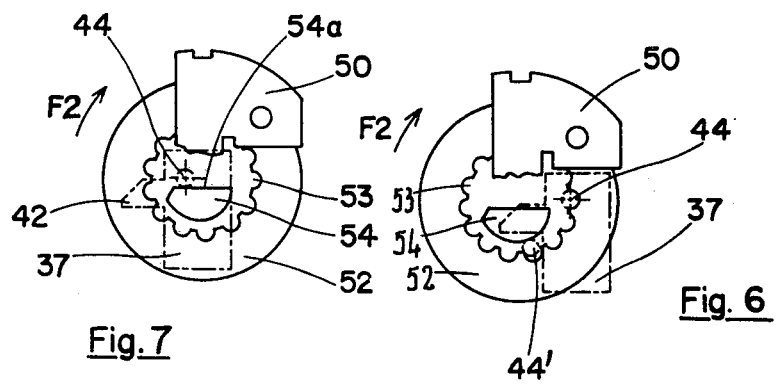
FIGS. 6 and 7 are diagrammatic views in two different positions of the locking control mechanism.
Figure 4:
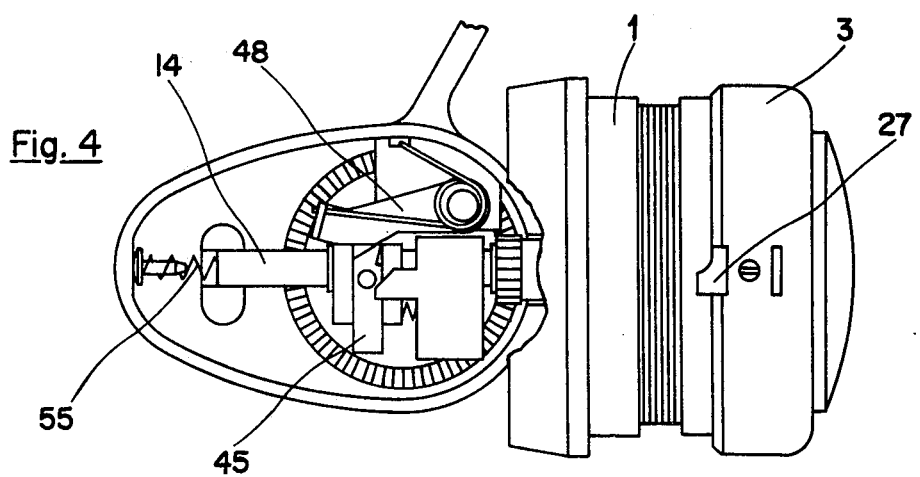

When the fisherman wishes to reel in the line, he turns crank 7 which drives, in the direction of arrow F2, gear 10 and the internally toothed ring 52 integral therewith (FIGS. 6 and 7). At the commencement of this rotation, stud 44 on slide 43 is in engagement with the teeth 53 in the position illustrated in FIG. 6 corresponding with the position of FIG. 4. Rotation of ring 52 drives stud 44 and with it cam support 37. The stud 44 comes to bear against the second fixed cam 54, an intermediate position thereof being illustrated at 44'.

Spring 55 opposes rearward axial displacement of stud 44 which is guided along a circular path by the second fixed cam 54 which holds it in engagement with of teeth 53 up to the rearmost point of travel. As shown in FIG. 6 cam 54 extends approximately semicircularly coaxially, at a slight axial spacing from teeth 53, so that the crank drives stud 44, and slide-block 43, for about half a revolution.

At the beginning of the axial rearwards displacement of support 37 by slide 43 spring 55, whose strength is calculated to be greater than that of spring 46, compels support 37 to come up against support 38 which is restrained axially by the bearing surface 40 on shaft 14, and by means of cam-forming plane 42, places latch 45 in the projecting position by means of stud 45a. During its axial travel, latch 45 lifts the swinging stop 48 which it passes by completely. At the end of the travel, stud 44 moves out of engagement with the hemispherical face of cam 54 to lie against the straight face of the latter where it is free from teeth 53 and enables gear 10 to freely rotate for winding in line, locking of cup 3 being effected at the same instant by stop 48 which pivots toward shaft 14 after the latch 45 has passed by it and prevents the return of support 38 which holds back cup 3 by the bearing surface 40.

Locking of cup 3 is therefore effected in half a turn of crank 7. With reference to FIGS. 8 to 15, in the second embodiment of reel, gear 10 bears a crank pin 59 consisting of an eccentric stud engaging in a transverse groove 60 in a slide 61 which slides a slideblock and lever support 62 locked for translation with shaft 14. Upon this slideblock 62 acts a tension spring 63 fastened to a pin 64 on casing 5. Spring 63 therefore tends to drive the slideblock 62 and shaft 14 together with cup 3 toward the front of the reel, i.e. towards the right in the drawing.

The slideblock 62 support first and second levers 65 and 66 (FIG. 8) pivoted thereon about respective pivots 67 and 68. Upon these two levers acts a hairpin spring 69 biasing both levers in clockwise directions as seen in FIG. 8. The ends of spring 69 are cranked to hold the lower cranked end 65a of lever 65 (FIG. 8) against the lever 66 and tend to downwardly separate the substantially horizontal arm of lever 66 from the pivot of lever 65 in the intermediate reeling-in position (FIG. 8), the lever 66 is prevented from moving down by end 65a of the lever 65 which engages in a first catch 66a on lever 66.

Figure 11:
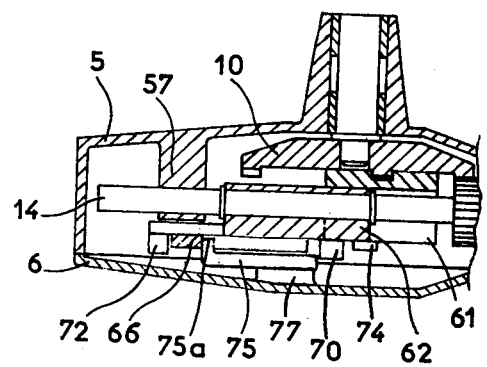
FIG. 11 is a partial cross-section taken along line XI—XI of FIG. 8.

The slideblock 62 also bears three stop-studs 70, 71, 72, the lengths of studs 70 and 72 being substantially equal and greater than that of stud 71. Casing 5 carries a stop 73 lying on the trajectory of lever 65 on slideblock 62. In FIGS. 8 and 10 there can likewise be seen a rectangular projection 74 machined on slide 61 and intended to cooperate with a shoulder 66b of lever 66 (FIG. 10). On the cover 6 are pivoted third and fourth levers 75, 76, one of which, 75, is shown in FIG. 11 whilst the other 76 is not shown in this FIGURE because it is located in the same vertical plane as and below the lever 75 in FIG. 11, the lever 76 being on the other hand shown in the operational diagrams of FIGS. 12 to 15. At the same time it is easy to see how the two levers 75 and 76 can be pivoted onto a face 77 on the cover 6 shown in FIG. 11. On these two levers 75 and 76 acts a hairpin spring 100 which tends to make the two levers turn in the counter-clockwise direction as seen in FIGS. 12 to 15. Lever 75 has a bent over or cranked end 75a and a claw 75b thereon the purpose of which will be explained later.

In FIGS. 12 to 15, only the members necessary to understand the operation of the locking mechanism have been shown.

Figure 12:
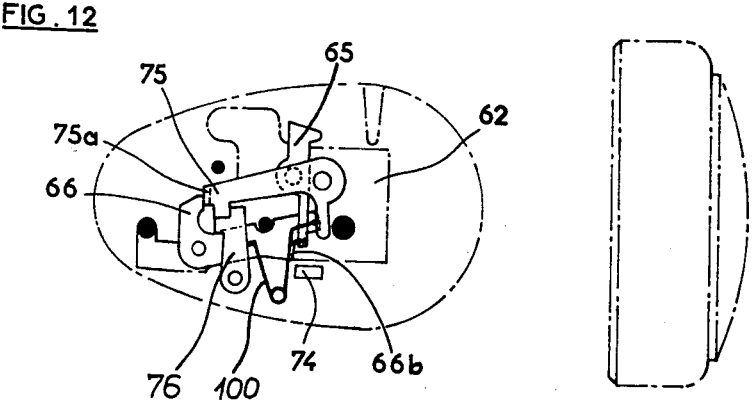

When the fisherman exerts pressure on cup 3 with his forefinger 58 (FIG. 13) in order to cast the slideblock 62 locked to cup 3 moves rearwardly and its stud 70 pivots third lever 75 to disengage the cranked end 75a of the lever 75 from the nose of the second lever 66 (FIG. 12). The fourth lever 76 is moved by spring 100 from the position shown in FIG. 12 to the position shown in FIG. 14, and comes to abut against a stop, not shown. The third lever 75 being disengaged, the slideblock 62 is released and pulled forward by the tension spring 63 into the position shown in FIG. 10; upon relaxing the pressure of the forefinger, the line disengages from pick-up 27 and comes against the fisherman's forefinger. Simultaneously the slideblock 62 brings first lever 65 into contact with stop 73; the lever 65 tilts, compressing spring 69 (FIG. 10) and moves from engagement with catch 66a into engagement with catch 66c (FIG. 15), bringing second lever 66 to rest on projection 74, a shoulder 66b on the lever 66 closing off the path of the projection 74. At the same instant, at the rear of slideblock 62 the fourth or separator lever 76 is pushed by the stud 72 (FIG. 15), spring 100 is compressed and claw 75b of lever 75 comes to seat again in the notch in the lever 76. The lever 75 closes off the trajectory of lever 66 for subsequent reeling in.

In order to pass from the open position or casting position of cup unit 3 illustrated in FIGS. 10 and 15 to the closed or recovery position thereof illustrated in FIG. 8, and then to lock the unit against return to the open position under the influence of tension spring 63, the fisherman actuates the crank as in the first embodiment, which drives slide 61 and its projection 74 by the crankpin 59. Starting from the position shown in FIG. 15, projection 74 moves towards the right, slightly displacing second lever 66 in the counter-clockwise direction. When the projection 74 has passed the shoulder 66b, lever 66 returns into the position shown in FIG. 10; thereby, during the next half-turn of the crank, the projection 74 moving leftwards comes to abut against the shoulder 66b (FIG. 10), driving the second lever 66 and with it the slideblock 62 towards the left. The vertical arm of the second lever 66 slightly diverts by an inclined edge the cranked end 75a of the third lever 75 which it crosses and passes completely beyond, thus enabling the third lever 75 to return to a stop on the end of the lever 76 and preventing return of the slideblock 62 by the fourth lever 66 which is stopped by the cranked edge 75a (FIG. 12.). The second lever 66 upon abutting against the cranked end 75a pivots in the counter clockwise direction, compresses the spring 69 which is weaker than spring 63 and comes to abut against stop 71. Because of this, catch 66a is caught by the cranked end 65a which is urged by spring 69 (FIG. 8). The shoulder 66b is drawn clear of the trajectory of the projection 74 and has no influence on reeling-in. The mechanism remains locked as long as the fisherman does not exert further pressure on cup 3 for a subsequent cast.

Figure 16:
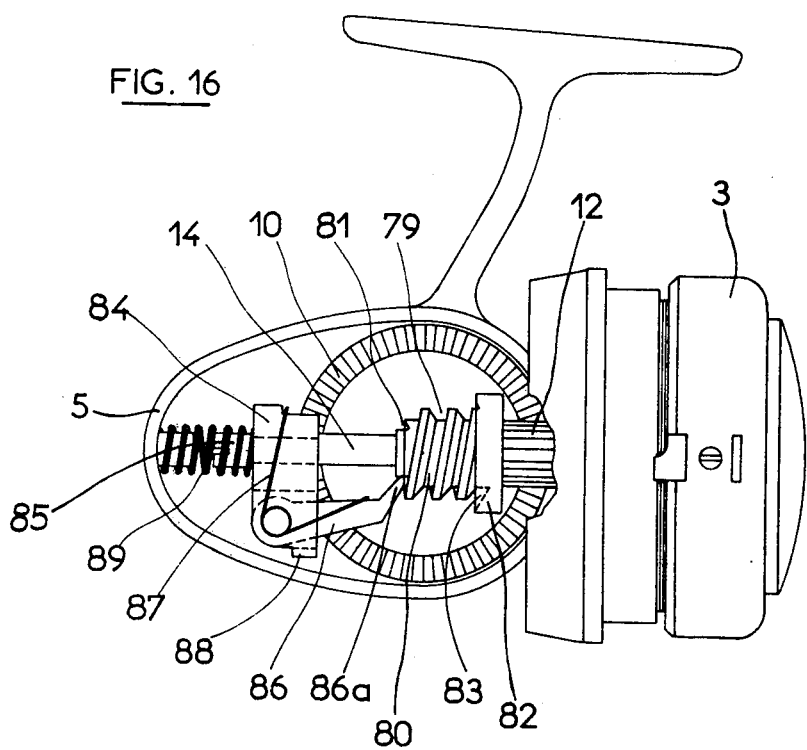
FIG. 16 is a view similar to FIG. 8 of a third embodiment.
Figure 17:
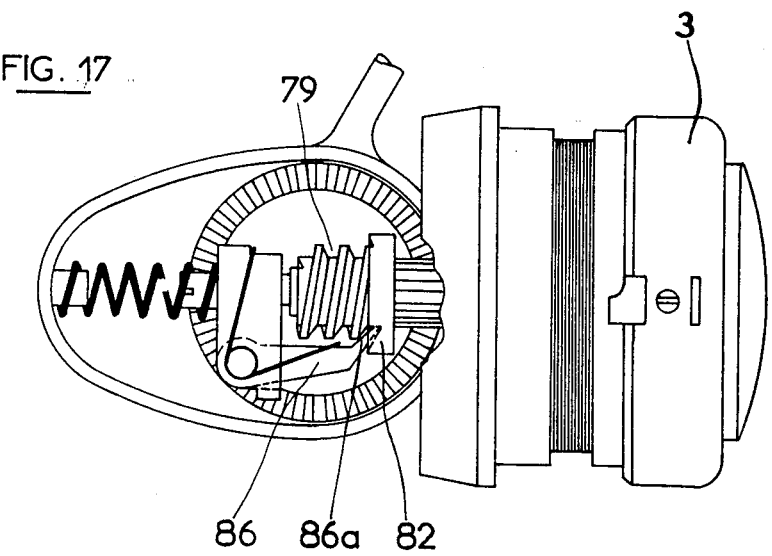
FIG. 17 shows the reel of FIG. 16 in the open position.

FIGS. 16 and 17 show a third embodiment of reel with a locking mechanism having a reduced number of parts. A sleeve 79 integral with pinion 12 bears a helicoidal groove 80 the sidewalls of which are frustoconical and substantially parallel, this helicoidal groove terminating at the lefthand end of sleeve 79 in a circular neck 81 the means diameter of which is less than the diameter of groove 80. At the righthand of sleeve 79 is a collar 82, the helicoidal groove extending into this collar over a portion of the circumference of the latter along a recess 83 the end of which forms a stop.

Onto a support 84 locked to the shaft 14, upon which it is held axially by a screw 85, is hinged a finger or tilting latch 86 subjected to the action of a hairpin spring 87 biasing finger 86 away from shaft 14. Pivoting of the finger 86 is limited by a stop 88 on support 84 so that in the separated position the end of finger 86 is spaced apart from the axis of shaft 14 by a distance less than the outer radius of collar 82.

Finger 86 has a cranked end 86a extending substantially parallel to the sidewalls of the helicoidal groove 80. A compression spring 89 is disposed between support 84 and casing 5.

The operation of this reel is as follows:
The reel being in the closed or recovery position as illustrated in FIG. 16, end 86a of finger 86 is engaged and retained in the neck 81 of sleeve 79. When the fisherman rotates the crank, sleeve 79 is rotated by pinion 12 but the finger 86 remains in neck 81. The cup 3 is thus rotated to reel in the line.

When the fisherman wishes to cast, he exerts pressure by means of his forefinger on cup 3 to push the support 84 towards the left which compresses spring 89 and disengages finger 86 from neck 81. The finger 86 is moved away from sleeve 79 by spring 87 and, when the fisherman relaxes the pressure on cup 3, the finger 86 can move towards the right until it meets the collar 82, cup 3 coming to occupy the position shown in FIG. 17. Return of cup 3 to the closed position shown in FIG. 16 is effected automatically by rotation of the crank. When the crank is actuated, finger 86 comes into the neck 83 in the collar 82 in the event that it was not already lying there. In its rotation, sleeve 79 drives the finger 86 towards the left, its end 86a being retained laterally by the frustoconical sidewall of groove 80, into the position shown in FIG. 16.

Figure 18:
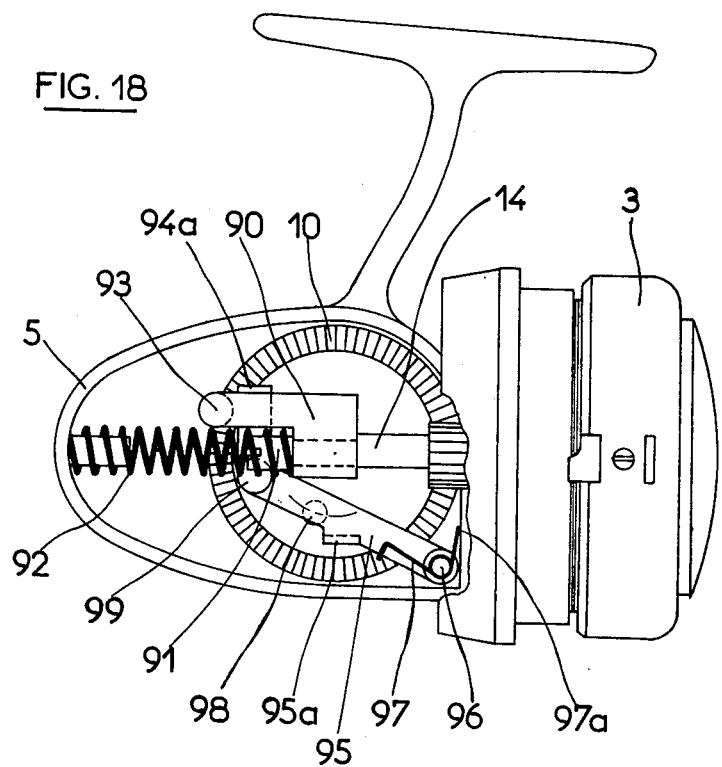
FIG. 18 is a view similar to FIG. 8 of a fourth embodiment.
Figure 19:
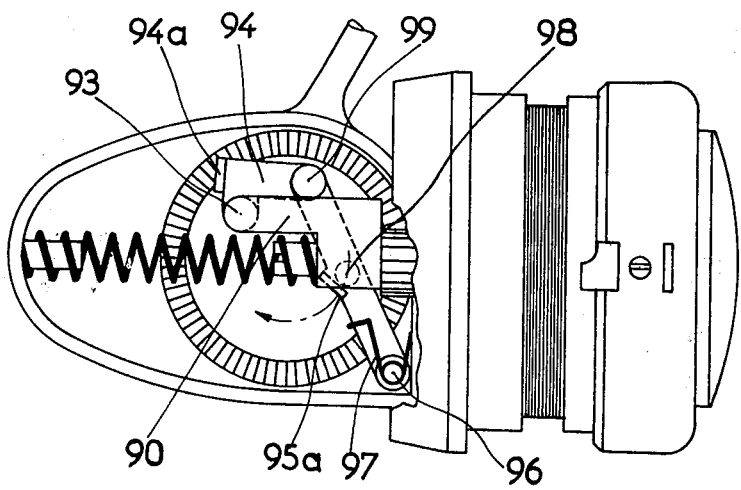
FIG. 19 shows the reel of FIG. 18 in the open or casting position.

Reference is now made in FIGS. 18 and 19 illustrating a fourth embodiment of reel with a toggle-type locking mechanism requiring very few parts. The mechanism comprises a support 90 attached to shaft 14 by means of a screw 91 which at the same time serves to hold a spring 92 compressed between support 90 and casing 5. Onto the support 90 is articulated at 93 one of the arms 94 of a toggle the second arms 95 of which is articulated to a pivot 96 on casing 5. A hairpin spring 97 with one end 97a hooked on casing 5 acts on arm 95 in the clockwise direction.

The arm 94 has a lug 94a and the arm 95 a lug 95a. The gear 10 bears an eccentric stud 98.

The operation of this mechanism is as follows:
In the closed or recovery position of the reel illustrated in FIG. 18 the toggle is held in the position shown by the action of spring 92 holding the ear 94a of arm 94 against support 90. This support 90 which tends to be pushed towards the right by spring 92 is thus held in position by the toggle. The stud 98 can turn with the gear 10 without meeting lug 95a of lever 95.

When the fisherman exerts pressure on cup 3 as described previously, and pushes the support 90 to the left with compression of spring 92, the point of attachment 93 of the toggle is brought approximately into the prolongation of the straight line passing through pivot 96 and articulation 99 of the toggle, so that the toggle moves abruptly into the position shown in FIG. 19 under the action of spring 97, and cup 3 is moved forward by spring 92. The spool is thus cleared and the reel is ready for casting.

Return to the reeling-in position of FIG. 18 is, as before, effected automatically by means of the crank. During rotation of the crank the stud 98 comes to abut against the ear 95a on arm 95, making this arm pivot in the counter-clockwise direction and at the same time driving support 90 towards the left until the articulation 99 of the toggle passes beyond the straight line joining its points of attachment 93, 96, the toggle then locking in the position shown in FIG. 18.

FIGS. 20 to 29 show an embodiment in which the shaft of the reel is axially reciprocated during reeling in of the line.

The members repeated from the first embodiment are designated by the same references.

The reel comprises a casing 5 on one of the faces of which is arranged a crank 7 integral with a shaft 8 which can rotate in bearings 104. To the other end of the shaft 8 is fixed a crown gear 10 with contrate teeth 11 meshing with a pinion 107 integral with a shaft 108. The shaft 108 is slidably mounted in a sleeve 109 rotatably mounted in casing 5 by means of a ball-bearing 110.

Shaft 108 bears a sleeve 111 to which is attached a winding cup 112 supporting a small line pick-up plate 113 attached by a screw 114, this plate having at its operative end adjacent the rear edge of cup 112 an arcuate notch 130.

On the other portion of cup 112 is arranged a line bearer member 169 along a line parallel to shaft 108 and passing through the centre of notch 130. This member 168 has a profile 169 (FIG. 24) avoiding catching of the line on it during casting, and is made of a hard polished material so as to facilitate sliding of the line over it during line recovery. In the example shown, member 168 and the pick-up plate 113 are formed by one and the same part attached to cup 112 by a screw 114, but they could consist of two distinct members.

Sleeve 111 is locked for rotation with shaft 108 by two flats 115 arranged on the outer cylindrical portion of the shaft 108 and in a corresponding internal cylindrical bore of sleeve 111. Sleeve 111 is locked axially to shaft 108 by a transverse sliding part 32 with a longitudinal opening 33 the edge of which engages in a neck 34 at the ned of shaft 108 under the action of a compression spring 35. The end of part 32 opposite spring 35 carries a button 119 movement of which towards shaft 108 frees the part 32 from the neck 34, thus unlocking from shaft 108 the reeler member which consists of sleeve 111, cup 112 and line pick-up plate 113.

Casing 5 includes a cylindrical support 16 made in one piece therewith. On support 16 a spool 1 is fixed axially by means of a clip 17 attached to the spool and engaging in a groove 18 in support 16 and in an axial recess 10 in spool 1. Rotation of spool 1 is braked by a ring 24 interleaved between two friction rings 23 and 25, adjustment being effected by a drum 22 screwed onto casing 5, this drum acting on a spring ring 21.

A support 135 axially slidably mounted on sleeve 111 bears a catcher lever 136 pivoted to it about a shaft 137. The catcher lever 136 includes a hook 138 and an incline 139 arranged on the rear face of a nose 140. This incline 139 is arranged face to face with an incline 133 on sleeve 111 and an incline 131 on sleeve 109. The incline 131 lies in the trajectory of the hook 138 of lever 136; a spring 141 constantly urges hook 138 towards shaft 108. The hook 138 has a dimension just sufficient to enter a groove 142 in the periphery of sleeve 109. In addition for certain positions of lever 136 the nose 140 is seated in a longitudinal groove 143 in sleeve 111.

A spring 144 arranged in a housing in a part of support 135 diametrically opposite lever 136 constantly urges the support 135 forwards by bearing against the sleeve 109. Several such springs 144 and housings could be provided. The support 135 carries a safety finger 134 arranged parallel to shaft 108 and of sufficient length to be capable of covering the distance which separates two cheeks 145 and 146 of spool 1. This finger could, however, be orientated differently with respect to the shaft 108.

An inner face 147 of finger 134 is substantially aligned with an inner face 148 of an annular safety lining 149 (FIG. 24) secured in cup 112, finger 134 being received in a longitudinal groove 150 in lining 149. Finger 134 is thus locked for rotation with cup 112. The inner faces 147 and 148 have a diameter such that they just let the cheeks 145 and 146 of spool 1 enter.

A stop 151 provided in cup 112 serves as an abutment for the safety finger 134 when the latter is pushed forwards by spring 144.

The gear 10 supports a driving member (FIGS. 21 and 27) which is attached to it by a screw 171. 71. This driving member comprises a mounting plate 170 supporting a first crankpin 173 which in turn supports an intermediate plate 174 supporting a second crankpin 175. The two crankpins are arranged in radial alignment with crowngear 10, crankpin 175 being arranged nearer to the axis than crankpin 173. The first crankpin 173 is slidably received in a slot in a first slide 176 capable of being displaced parallel to shaft 108 when crankpin 173 is rotated by gear 10.

The second crankpin 175 is slidably received in a groove 177 in a second slide capable of being displaced axially along a portion 179 of shaft 108 when crankpin 175 is rotated with gear 10 and crankpin 173.

The second slide 178 supports a shaft 180 upon which is pivoted a latch 185 having a first end 186 and a second end 187.

A support 155 is mounted on a cylindrical portion of the shaft 108 adjacent to pinion 107. This support 155 is axially locked to the shaft 108 upon which it is held between one face of pinion 107 and a clip 156 held in a radial groove in shaft 108. Support 155 has an rearwardly directed incline 157 and a notch 158.

An extension of support 155 carries a shaft 159 on which is pivoted a first lever 160 by an oblong bearing 161. The first lever 160 has towards the front a first incline 162 adapted to cooperate with the second end 187 of latch 185 and towards the rear a second incline 163 the trajectory of which meets an incline 200 fixed on casing 5. This first lever 160 likewise has a first notch 164 arranged at the front facing latch 185 and a second notch 165 in its opposed side. For certain positions of the first lever 160 its first notch 164 has a trajectory such that it can contact the second end 187 of latch 185 and its second notch lies in trajectory of a finger 199 integral with the first slide 176.

The second notch 165 has such a shape, for example inclined, that in spite of the action of a spring 196 which tends to displace it upwards, the said notch 165 remains in engagement with finger 199 when the latter displaces the first lever 160 backwards.

A stop 194 on cover 6 (FIG. 21) is adapted to serve as a stop for the front face 195 of support 155.

The second slide 178 supports a shaft 188 on which is pivoted a second lever 189. This second lever 189 has towards the front a hook 190 and immediately behind the hook a forwardly directed incline 191; the hook 190 and incline 191 are arranged in the same trajectory as the notch 158 and incline 157 of support 155. The second lever 189 likewise has a first notch 192 and a second notch 193 capable of lying in the trajectory of the first end 186 of latch 185.

The tension spring 196 connects the second lever 189 and first lever 160 by means of two catch members 197 and 198 integral with the respective levers. Spring 196 constantly tends on the one hand to bring the two movable ends of the levers together and on the other hand to separate the support 155 and second slide 178 from one another.

In operation of this reel, a number of successive phase may be considered.

Figure 21:
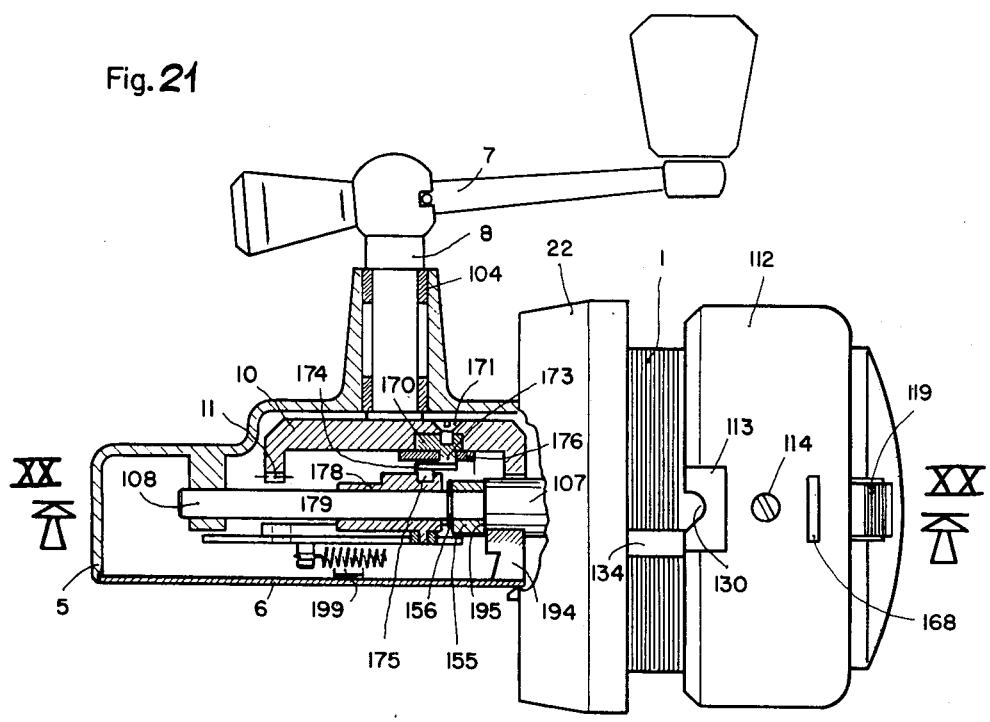
FIG. 21 is a cross-section taken along the line XXI—XXI of FIG. 20.

FIGS. 20 and 21 show the various members in a position for reeling in line, taken as starting position. The hook 190 on second lever 189 is locked on notch 158 in support 155. The latch 185 is in the disengaged position; its first end 186 is seated in the first notch 192 in second lever 189 and its second end 187 bears against the first incline 162 on first lever 160. Spring 196 in tension between the two levers holds hook 190 on notch 158.

In addition hook 138 of lever 136 is held in the groove 142 in sleeve 109 by spring 141. The support 135 and finger 134 are thus locked axially to casing 5 and simultaneously cup 112 and pick-up plate 113 are axially locked to the second slide 178 by means of shaft 108, support 155 and second lever 189.

When crank 7 is rotated, gear 10 rotates a cup 112 and simultaneously, by the action of second crankpin 175 on second slide 178 drives cup 112 with an axial reciprocating movement on shaft 108. The pick-up plate 113 borne by cup 112 can thus lay the fishing line in successive rows onto spool 1. The lay is very regular because the line is accurately guided by the arcuate notch 130 arranged at the rear edge of cup 112 disposed in the immediate proximity of spool 1.

Simultaneously finger 134 rotates with cup 112, by engagement in groove 150. If during reeling in the fishing line accidentally escapes from notch 130, finger 134 guides it automatically back into the said notch, thus avoiding tangling of the line.

Moreover, during reciprocation of cup 112 the annular safety lining 149 prevents the line from accidentally pentrating into the gap between the front cheek of spool 1 and the inner face 148 of cup 112.

Finger 134 and lining 149 thus cooperate during reeling in ensure laying of the line on spool 1 with complete safety.

Figure 22:
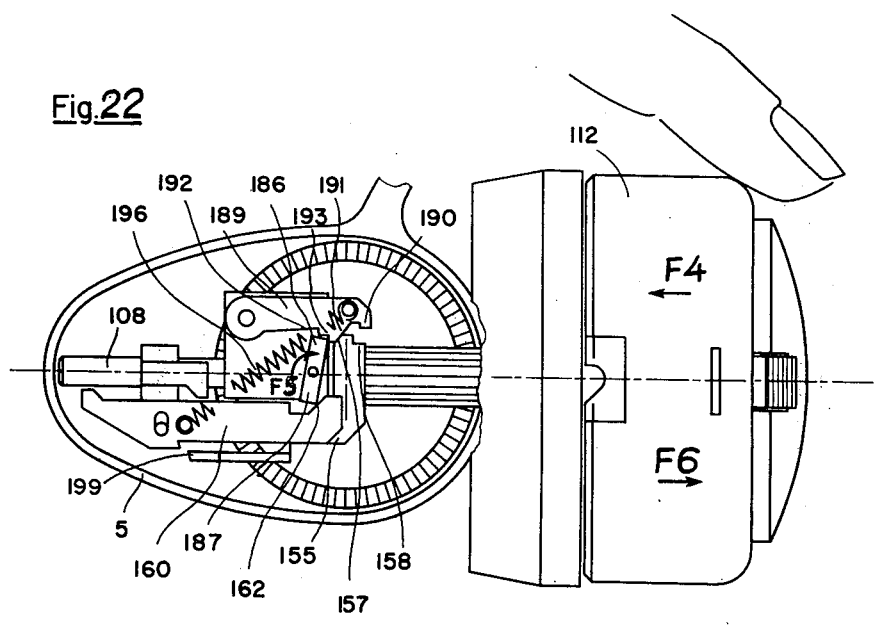
FIG. 22 shows the reel of FIG. 20 in a position during preparation for casting.

FIG. 22 shows the various members in casing 5 in one phase of preparation for casting.

Before casting, cup 112 and finger 135 must be displaced forwards to completely clear spool 1. To achieve this, the fisherman exerts a light finger pressure on cup 112 in direction F4, which causes a slight rearward movement of shaft 108 and support 155. The incline 157 on support 155 pushes up (FIG. 22) the corresponding incline 191 of second lever 189 and hook 190 is disengaged from notch 158 in support 155 against the action of spring 196.

Simultaneously, the rearward movement of support 155 causes rearward movement of the first lever 160 whereby first incline 162 turns latch 185 in direction F5 so that its first end 186 disengages from first notch 192 on second lever 189 following the upward movement of this latter lever. The second end 187 of latch 185 is guided by incline 162 so that its first end 186 engages and self-jams in second notch 193 in lever 189, which keeps lever 189 raised against the action of spring 196 and, under the action of spring 196, pushes forwards in direction F6 the first lever 160, its support 155 and, by means of shaft 108, the cup 112.

Figure 23:
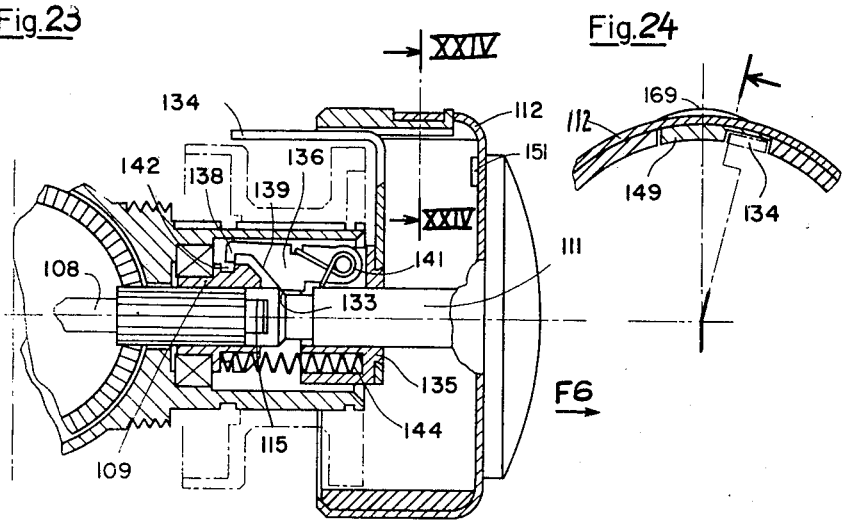
FIG. 23 shows part of the reel of FIG. 20 in a position during unlocking of a safety finger.
Figure 24:
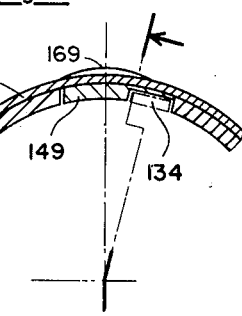
FIG. 24 is a partial cross-section taken along line XXIV—XXIV of FIG. 23 showing a re-reeler member and annular safety lining.

FIG. 23 shows the various members in the next phase, i.e. of unlocking finger 134. Shaft 108 moves forward with sleeve 111 and incline 133 on this sleeve 111 pushes up (FIG. 23) the corresponding incline 139 on lever 136, which pushes the hook 138 up out of neck 142 in sleeve 109. The support 135 is therefore freed for forward movement in direction F6 under the action of spring(s) 144, and finger 134 comes to abut against stop 151 in cup 112.

FIG. 25 shows the various members in the casting position. During the previous phase, the forward movement of shaft 108 was accompanied by forward movement of first lever 160, the first notch 164 rotating end 187 of latch 185 in direction F7.

End 186 of latch 185 therefore disengages from notch 193 in lever 189 and engages in notch 192, which allows downward displacement (FIG. 25) of lever 189 and hook 190 under the action of spring 196; this hook 190 thus lies once again in the trajectory of the incline 191 and notch 158 of support 155.

At the same time, end 187 of latch 185 disengages from notch 164 in lever 160 and immediately afterwards the second incline 163 on lever 160 is pushed down (FIG. 25) by the incline 200 on casing 5, this displacement being made possible by the oblong shape of bearing 161. This brings the notch 165 of lever 160 into the trajectory of finger 199 of the first slide 176. The forward movement of shaft 108 is limited by stop 194 against which the front face 195 of support 155 abuts. The spring 196 and spring(s) 144 tend to hold the cup 112 in this forward position in which the rear edge of cup 112 and the pick-up plate 113 as well the rear end of finger 134 completely clear spool 1 so that the line can escape freely from spool 1 during the casting operation without encountering any obstacle liable to brake it. During casting the line slips with virtually no resistance over the polished profile 169 of bearer member 168.

FIGS. 26 and 27 show the operational phase corresponding to commencement of the line reeling-in operation. When the fisherman grasps the crank in order to reel in the line, the crowngear 10 has a random angular position as do crankpins 173 and 175. When gear 10 is rotated crankpin 175 drives the second slide 174 in a to-and-fro motion, and crankpin 173 likewise axially reciprocates slide 176 enabling finger 199 during its first rearward displacement to catch in notch 165 and drive lever 160 rearwardly in direction F4 together with support 155, shaft 108 and cup 112. If finger 199 lies behind notch 165 when the fisherman starts to rotate the crank, the finger 199 must perform a forward movement before being able to catch in notch 165 during its first rearward movement. Upon being driven backwards, incline 163 of lever 160 leaves the incline 200 on casing 5. The incline 191 on support 155 pushes up the nose 190 of lever 189, the nose falling back into notch 158 under the action of spring 196. Thus, by means of lever 189 and support 155, slide 178 drives the shaft 108 and cup 112.

Cup 112 simultaneously rearwardly displaces support 133, finger 134 and lever 136; at the end of its rearward travel, the hook 138 on lever 136, after having been raised by incline 131 (FIG. 26) on sleeve 109, falls back into groove 142 under the action of spring 141. Finger 134 thus remains locked to casing 5 during the reciprocation of cup 112. At the first forward return of the two slides, finger 199 of slide 176 disengages from notch 165 in lever 160, its speed being greater than that of lever 160 because crankpin 173 of slide 176 carrying finger 199 is at a greater distance from the axis of the gear 10 than is crankpin 175 of slide 178. The notch 165 being thus freed from finger 199, lever 160 moves backs under the action of spring 196 out of the trajectory of finger 199.

As indicated by FIGS. 28 and 29, at the same time as they are displaced rearwards, cup 112 and finger 134 are rotated in direction F8 by gear 10; the finger 134 meets the line and should the latter be slack this finger reels the first turns of the slack end of line, then as the line tautens it runs along finger 134 which guides it into the arcuate notch 130 which thereafter guides the line onto spool 1, and lays it in contiguous turns. During reeling in, the taut line does not rub against the outer surface of cup 112 but against the polished bearing member 168.

The various members are then in the line reeling-in position, as previously described with reference to FIGS. 20 and 21.

FIG. 30 shows an alternative form of line pick-up formed by a plate 213 with a slightly slanted incline 214, the arcuate notch 130 being replaced by a notch 215 in the shape of a slanted slit. Operation of this pick-up is identical to that previously described but has the advantage that during casting the incline 214 holds the line backwards and ensures that it jumps over notch 215 without its being liable to be braked by this notch. The length of cast is thereby improved.

FIG. 31 shows another form of pick-up in which the notch 215 is replaced by a small roller or pulley 216 rotatably mounted on plate 213. The operation of this pick-up is identical to that of FIG. 30 but during reeling-in the pully 216 reduces friction.

Of course, these varied forms of pick-up could be incorporated in any of the described embodiments.

The reel according to the invention may be employed when it is required to ensure on the one hand a long distance cast and on the other hand reeling-in and laying of the line with complete safety. It may in particular be employed for sports fishing.

What is claimed is:

1. A fishing reel comprising:
a casing;
a normally fixed line spool thereon;
a shaft passing coaxially through said spool, into said casing, the shaft having a front end portion and a rear end portion;
a manually shiftable winding cup fixed coaxially on the front end portion of the shaft;
a line pick-up member on the winding cup;
crank means engageable with an intermediate portion of the shaft for rotating the shaft with the cup and pick-up member;
mounting means in the casing for mounting the rear end portion of the shaft for axial displacement of the shaft with the winding cup and pick-up member relative to the spool between a first forwardmost casting position, a second intermediate reeling-in position and a third rearmost position, in which first position the cup and pick-up member are disposed in front of the spool whereby the spool is uncovered for unreeling a line, by casting without engagement of the line with the pick-up member, and in which second position the pick-up member is disposed over the spool for guiding and winding the line onto the spool in response to actuation of said crank means;
spring means for axially urging the shaft and winding cup in a direction from said third rearmost position towards said first forwardmost casting position; and
locking control means in said casing, comprising locking means for releasably locking the shaft and cup against the action of said spring means in said second position, when the shaft and cup have been manually shifted from the first forwardmost casting position to the second intermediate reeling-in position, and means for disengaging said locking means in response to movement of the shaft and cup from said reeling-in position into said third rearmost position to the first forwardmost casting position under the action of said spring means, the winding cup being accessible for manually moving it from the second intermediate reeling-in position to the third rearmost position and for manually holding and guiding line thereon in said first forwardmost casting position.

2. A reel as claimed in claim 1, in which the locking means comprises a support axially locked to the shaft, at least one part movable on the support and at least one fixed stop against which stop said movable part abuts in a position wherein the locking means locks the shaft against the axial displacement thereof.

3. A reel as claimed in claim 1, in which the locking means includes pusher means slidable on said winding cup and engageable with the shaft.

4. A reel as claimed in claim 1, also including second locking means engageable for releasably locking the shaft and cup to one another in said first position, and means cooperating with said crank means for disengaging said second locking means to enable moving the shaft and cup from the first forwardmost casting position to the second intermediate reeling-in position in response to actuation of said crank means.

5. A reel as claimed in claim 1, in which the locking control means includes a toggle in the casing having one end pivotally attached to the casing and another end pivotally attached to the shaft, said locking control means including a finger rotatable with the crank means and acting on the end of the toggle pivotally attached to the casing.

6. A reel as claimed in claim 1, including reciprocator means in the casing for reciprocating the shaft in response to rotation of the crank means; and means for locking the rear end portion of the shaft onto said reciprocator means in response to rotation of the crank means in a direction for reeling in a line, and for unlocking the shaft from said reciprocator means in response to manual shifting of the winding cup towards the spool against the action of said spring means.

7. A reel as claimed in claim 6, comprising a safety member secured to and rotatable with the winding cup for guiding line onto the pick-up member; means for locking said safety member to the casing against axial translation of the winding cup during reeling-in; and means comprising an intermediate portion of the shaft, for unlocking said safety member.

8. A reel as claimed in claim 7, in which the winding cup has an inner surface, adjacent to the line pick-up member, and a groove in said surface in which said safety member is seated radially, in and between the first and third positions of the winding cup, said inner surface fitting about the spool with a slight clearance.

9. A reel as claimed in claim 6, in which the locking control means comprises a first catcher member pivotally secured to the shaft and at least indirectly engageable with the casing, and first slide means movable by the crank means with a reciprocating motion parallel to the shaft and controlled by the first catcher member.

10. A reel as claimed in claim 9, in which the reciprocator means includes a second slide means in said casing reciprocally movable parallel to the shaft, and means rotatable by the crank means for reciprocally moving the second slide means for releasably locking the shaft onto the reciprocator means.

11. A reel as claimed in claim 10, in which the means for releasably locking the shaft onto the reciprocator means includes a second lever pivoted onto the second slide means, said second lever having a second catcher member engageable with the shaft, and control spring means acting to keep the first and second catcher members in contact with one another for said locking of the shaft onto the reciprocator means.

12. A reel as claimed in claim 11, including means for unlocking the shaft from the reciprocator means, comprising means axially locked to the shaft and engageable with the second lever for counteracting said control spring means.

13. A reel as claimed in claim 11, including a latch pivoted to the second means, a catch member integral with the first lever, and means for enabling said catch member by tilting of the latch to become engageable with the shaft.

14. A reel as claimed in claim 7 in which the means for locking said safety member to the casing includes a catch member locked to the casing against axial motion, another catch member pivotally engaging said safety member, and spring means for keeping the catch members in contact with one another to control the unlocking of said safety member.

15. A reel as claimed in claim 1, in which the line pick-up member includes means defining an arcuate notch in the winding cup adjacent a rear edge thereof for guiding a line onto the pick-up member during the reeling-in of the line.

16. A reel as claimed in claim 1, including an incline on a rear edge of the winding cup, a raised portion of said incline being disposed close to said notch to reduce line friction during reeling-in.

17. A reel as claimed in claim 16 including a pulley in said notch to reduce line friction during reeling-in.

18. A reel as claim 1 including bearing means on the winding cup for bearing a fishing line during reeling-in, said bearing means being located substantially on a straight line passing through the pick-up member and parallel to the shaft, said bearing means having a portion profiled to avoid catching of the fishing line during casting.

19. A reel as claimed in claim 1, in which said means for locking the shaft and cup against the action of said spring means comprises:
   a latch support axially fixed to the shaft subject to rotation of the shaft in the support;
   a latch on the support slidable transversely to the shaft between latching and nonlatching positions and resiliently biased to a non-latching position;
   a cam mounted on the shaft, subject to rotation of the shaft in the cam, for forward and rearward sliding along the shaft, to place the latch into the latching position on rearward sliding of the cam;
   means drivable by said crank means for effecting the forward and rearward sliding of the cam; and
   a stop member mounted in the casing and resiliently biased to stop any forward movement of the latch, beyond a position thereof corresponding to the intermediate reeling position of the shaft and cup, when the latch is in a latching position.

20. A reel as claimed in claim 19, in which the means drivable for effecting forward and rearward sliding of the cam comprises;
   a gear mounted for rotation by said crank means for rotating said shaft and thereby said cup in the reeling-in position thereof;
   a slideblock on said shaft integral with said cam;
   means on said slideblock engageable by said gear for rearwardly sliding the slideblock, and thereby the cam, during a part of each rotation of the gear; and
   means for resiliently forwardly sliding the slideblock on completion of said part of each rotation of the gear.

21. A reel as claimed in claim 20 in which the gear includes a crown with inwardly projecting teeth, the means engageable by the gear comprising a pin mounted on the slideblock for engagement by such inwardly projecting teeth upon the forward sliding of the slideblock, and cam means for keeping the pin engaged by the teeth during said part of each rotation of the gear and for thereupon releasing the pin from the teeth.

22. A reel as claimed in claim 1, in which said locking control means comprises;
   a lever support axially locked to the shaft subject to rotation of the shaft in the support; a first lever pivoted to the support; a second lever separately pivoted to the support, said first and second levers being resiliently biased to enable the first lever by a first end portion thereof to normally restrain a first end portion of the second lever;
   a third lever pivoted to the housing and having a first end portion resiliently biased to normally restrain a second end portion of the second lever in the reeling-in position of the cup, shaft, and lever support and thereby to lock the second lever, lever support, shaft and cup against the action of the spring means; and
   stop means on the lever support for acting on a second end portion of the third lever when the cup, shaft and lever support are manually moved rearwardly from the reeling-in position to release the second end portion of the second lever from the first end portion of the third lever, and thereby to unlock the lever support, shaft and cup for forward movement into the casting position.

23. A reel as claimed claim 22 including;
   a slide part drivable by the crank in reciprocating forward and rearward movements along the shaft and having a projection engageable with the second lever upon the release of the second lever from the third lever to drive the second lever, lever support, shaft and cup rearwardly, on the first rearward movement thereof, into the position in which the third lever restrains the second and thereby locks the second lever, lever support, shaft and cup in the reeling-in position; and
   a fixed stop in the casing engageable with a second end of the first lever to release the first ends of the first and second levers from one another on completion of the forward movement into the casting position.

24. A reel as claimed in claim 22 in which the means for disengaging said locking means comprises;
   a fourth lever pivoted in the casing, engageable with the third lever in the forwardmost casting position of the cup, shaft and lever support, and
   additional stop means on the lever support, engageable with the fourth lever on forward movement of the shaft and lever support to enable the third lever to re-engage the second lever.

25. A reel as claimed in claim 1 in which said means for locking the shaft and cup against the action of said spring means comprises:
   a tiltable latch axially fixed to the shaft subject to rotation of the shaft relative to the latch, the latch having an end and being resiliently biased to move said end a limited distance away from the shaft; and
   a sleeve rotatable with the shaft, defining, coaxially with the shaft, a helicoidal groove and radially smaller, circular neck at a rear end of said groove, for engagement of the end of the latch with the groove to move the latch by rotation of the shaft and sleeve from the forwardmost casting position rearwardly along the groove for corresponding rearward motion of the shaft and cup, and thereupon to engage the end of the latch with the neck to lock the shaft and cup against forward movement by the spring means beyond the reeling in position.

26. A reel as claimed in claim 25 including a collar secured to the sleeve and located at the front end of the helicoidal groove to lock the end of the latch and thereby the shaft and cup against forward movement by the spring means beyond the casting position; and means on said collar for moving the end, of the latch inwardly into said groove on rotation of the shaft, sleeve and collar by the crank means.

27. A reel as claimed in claim 26 in which said helicoidal groove has a sidewall disposed at an acute angle relative to the shaft to hold the end of the latch against the resilient biasing thereof.

28. A reel as claimed in claim 26 including a stop to limit tilting of the latch, against the resilient biasing thereof, and thereby to keep the end of the latch engageable with said collar.

29. A reel as claimed in claim 1 in which said means for locking the shaft and cup against the action of the spring means comprises;

a toggle arm support axially fixed to the shaft subject to rotation of the shaft relative to the support;

a toggle comprising a first toggle arm pivoted to said support and a second toggle arm pivoted to said casing to define a first position of the toggle in which the support, shaft and cup are in the intermediate reeling-in position and a second position of the toggle in which they are in the forwardmost casting position;

means for the resiliently biasing the toggle toward its second position; and means drivable by the crank means for driving the second toggle arm thereby the toggle support, shaft and cup into the first position to lock the support, shaft and cup in the reeling-in position.

\* \* \* \* \*

UNITED STATES PATENT OFFICE
CERTIFICATE OF CORRECTION

Patent No. 3,993,263        Dated November 23, 1976

Inventor(s) Jean-Paul Lemery and Gaston Pithois

It is certified that error appears in the above-identified patent and that said Letters Patent are hereby corrected as shown below:

Fig. 25, the reference numeral "151" should read -- 157 --.

Col. 1, line 55, "subject" should read -- subjected --1
Col. 2, line 36, "pick-up" should read -- picking-up --.
Col. 4, line 21, "black" should read -- block --;

line 27, "positions" should read -- position --.

Col. 6, line 30, after "the" add -- unit is in the intermediate reeling-in position and the --;

line 66, after "66b," add -- second --;

Col. 7, line 26, "means" should be -- mean --.

Col. 8, line 5, "arms" (second occurrence) should read -- arm --

Col. 9, line 4, "ned" should read -- end --.

Col. 10, line 47, "phase" should read -- phases --.

Col. 11, line 11, "pentrating" should read -- penetrating --.

Col. 16, line 23, (Claim 23) after "claimed" add -- in --.

Signed and Sealed this

Twenty-ninth Day of March 1977

[SEAL]

Attest:

RUTH C. MASON
Attesting Officer

C. MARSHALL DANN
Commissioner of Patents and Trademarks